(12) United States Patent
Nishino

(10) Patent No.: US 7,744,282 B2
(45) Date of Patent: Jun. 29, 2010

(54) MOTOR

(75) Inventor: Hirotake Nishino, Shizuoka-ken (JP)

(73) Assignee: Alphana Technology Co., Ltd., Shizuoka (JP)

( * ) Notice: Subject to any disclaimer, the term of this patent is extended or adjusted under 35 U.S.C. 154(b) by 358 days.

(21) Appl. No.: 11/639,242

(22) Filed: Dec. 15, 2006

(65) Prior Publication Data

US 2007/0165972 A1 Jul. 19, 2007

(30) Foreign Application Priority Data

Jan. 13, 2006 (JP) ............................ P2006-005926

(51) Int. Cl.
*F16C 33/74* (2006.01)

(52) U.S. Cl. ................... 384/130; 384/100; 384/119

(58) Field of Classification Search ................. 384/100, 384/130, 107, 112–113, 119, 121, 133, 397–398, 384/400, 415; 310/58–59, 90.5
See application file for complete search history.

(56) References Cited

U.S. PATENT DOCUMENTS

| | | | | |
|---|---|---|---|---|
| 3,357,756 A | * | 12/1967 | Fehr | 310/90.5 |
| 4,495,830 A | * | 1/1985 | Yasue et al. | 74/467 |
| 6,126,414 A | * | 10/2000 | Koike | 384/105 |
| 6,709,160 B1 | * | 3/2004 | Ward et al. | 384/286 |
| 6,715,921 B2 | * | 4/2004 | Mochizuki et al. | 384/415 |
| 6,750,572 B2 | * | 6/2004 | Tornquist et al. | 310/59 |

FOREIGN PATENT DOCUMENTS

| | | | |
|---|---|---|---|
| CN | 1436284 A | | 8/2003 |
| JP | 58084260 A | * | 5/1983 |
| JP | 01095217 A | * | 4/1989 |
| JP | 03047493 A | * | 2/1991 |
| JP | 5-130754 A | | 5/1993 |
| JP | 07008835 A | * | 1/1995 |
| JP | 08135458 A | * | 5/1996 |
| JP | 08270620 A | * | 10/1996 |
| JP | 09041982 A | * | 2/1997 |
| JP | 11315825 A | * | 11/1999 |
| JP | 2000-116053 A | | 4/2000 |
| JP | 2001003953 A | * | 1/2001 |
| JP | 2001-061253 | | 3/2001 |
| JP | 2004132319 A | * | 4/2004 |
| WO | WO 9108834 A1 | * | 6/1991 |

* cited by examiner

*Primary Examiner*—Marcus Charles
(74) *Attorney, Agent, or Firm*—The Nath Law Group; Jerald L. Meyer; Stanley N. Protigal

(57) ABSTRACT

One embodiment of the present invention provides a motor comprising a stator portion including a bearing using lubricant oil; and a rotor portion having a rotation shaft rotatably supported by the bearing, an oil deflector configured to return back to the bearing the lubricant oil that has leaked toward one end portion of the rotation shaft from the bearing, and a hub attached so as to oppose the oil deflector with a clearance therebetween.

2 Claims, 8 Drawing Sheets

MOTOR

BACKGROUND OF THE INVENTION

1. Field of the Invention

This invention relates to a motor comprising a stator where a lubricated bearing is fitted in a bearing holder; and a rotor where a rotation shaft is rotatably supported by the bearing, an oil deflector is provided on one end portion of the rotation shaft in order to return lubricant oil back to the bearing, the lubricant oil having leaked from the bearing to the one end portion of the rotation shaft, and a hub is fixedly attached to the rotation shaft so as to oppose the oil deflector, thereby preventing the lubricant oil from reaching the hub even when the oil leaks from the bearing and reaches the oil deflector.

2. Description of the Related Art

Generally, a motor is composed of a stator stationarily mounted therein and a rotor rotatably driven in relation to the stator.

The above-mentioned stator includes a motor base stationarily mounted therein, a bearing holder attached on the motor base, a bearing fitted in the bearing holder, a stator core and a plural of coils wound around the stator core.

On the other hand, the afore-mentioned rotor is composed of a rotation shaft rotatably supported by the bearing, a hub fixedly attached on one end portion of the rotation shaft, a rotor yoke rotatable in unison with the hub and a magnet fixedly attached on the rotor yoke.

The plural of coils wound around the stator core of the stator oppose the magnet provided in the hub via the rotor yoke, with a slight gap allocated therebetween. The motor composed as above operate in such a way that a magnetic force is generated between the stator coil and the magnet when the stator coil provided for each phase is energized, so as to rotate the hub integrally with the rotation shaft.

By the way, the hub can be provided with a polygon mirror, a hard disc, an optical disc or the like.

As the bearing for rotatably supporting the rotation shaft, there is used a lubricated bearing such as an oil-impregnated sintered bearing, a fluid pressure bearing, a ball bearing or the like. Among the motors using such a bearing, there is disclosed for example in Japanese Patent Application Laid-open Publication No. 2001-61253 (pages 3 to 4, and FIG. 2) a motor designed to prevent a reduction of lubricant oil in an oil-impregnated sintered bearing.

FIG. 1 is a magnified vertical cross-sectional view of the oil-impregnated sintered bearing in the related art motor, the oil-impregnated sintered bearing supporting rotatably a rotation shaft.

A related art motor 100 shown in FIG. 1 is disclosed in the aforementioned publication (No. 2001-61253) and will be explained briefly here referring thereto.

In the related art motor 100 shown in FIG. 1, a stator portion S has a bearing holder 102 mounted on a motor base 101. The bearing holder 102 has a center hole 102 into which an oil-impregnated sintered bearing 104 impregnated with oil 103 is fitted by pressure-fitting or a like method. The oil-impregnated sintered bearing 104 is cylindrically shaped and has a center hole 104a penetrating the center portion thereof. In addition, the oil-impregnated sintered bearing 104 has a first circular concave portion 104b on the top and a second circular concave portion 104c on the bottom, the concave portions 104b, 104c being open in a shape of circular concave.

On the other hand in a rotor R, there is supported rotatably a rotation shaft 105 in the center hole 104a of the oil-impregnated sintered bearing 104 as follows. On one end portion (an upper end portion) of the rotation shaft 105, a first rotation body (equivalently, a first oil deflector) 106 and a hub 107 are fixedly attached by pressure-fitting or a like method so that the hub 107 tightly contacts the first rotation body 106. On the other end (a lower end) of the rotation shaft 105, a second rotation body (equivalently, a second oil deflector) 108 is fitted into the center hole 104a, the second rotation body 108 being composed of a cut-washer. The rotation shaft 105 is inserted into the center hole 104a of the oil-impregnated sintered bearing 104 until the tip of the other end abuts a thrust plate 109 attached on the motor base 101.

The first and the second rotation body (respectively equivalent to the first and the second oil deflector) 106, 108, which are provided respectively on the one portion and the other end of the rotation shaft 105, are positioned in the first and the second circular concave portion 104b, 104c respectively provided in the upper and the lower portion of the oil-impregnated sintered bearing 104. The oil 103, even if leaked from the oil-impregnated sintered bearing 104, can be splattered by the first and the second rotation body 106, 108 into the first and the second circular concave portion 104b, 104c, thereby preventing a reduction of the oil impregnated in the bearing 104.

Although the related art motor 100 can prevent a reduction of an oil amount in the oil-impregnated sintered bearing 104 by attaching the first and the second rotation body (respectively equivalent to the first and the second oil deflector) 106, 108 on the one portion and the other end of the rotation shaft 105, part of the oil 103 that has leaked from the oil-impregnated sintered bearing 104 may leak farther to the hub 107 via the first rotation body 106.

The reason why this happens will be described in the following. The first rotation body (equivalent to the first oil deflector) 106 pressure-fitted to the one end (the upper end) portion of the rotation shaft 105 as a center hole 106a; and the hub 107 has also a center hole 107a Regarding these center holes 106a, 107b, it is rather impossible to realize a perfectly precise diameter and circularity. Therefore, when the first rotation body 106 is pressure-fitted to the one end of the rotation shaft 105 and then the hub 107 is pressure-fitted on the first rotation body 106, the center hole 106a of the first rotation body 106 and the center hole 107a of the hub 107 may deform to easily cause clearance between these holes 106a, 107a and the rotation shaft 105. Under these circumstances, since the first rotation body 106 and the hub 107 tightly contact each other, the oil 103 that has leaked upward from the oil-impregnated sintered bearing 104 can come above the upper surface (not shown) of the hub 107 passing through the clearance due to capillary phenomenon.

In addition, some (or, a slight) amount of the oil 103 leaked from the oil-impregnated sintered bearing 104 can flow along the circumferential surface of the first rotation body 106 to reach the lower surface of the hub 107 that is tightly fixed to the first rotation body 106 and then to reach the upper surface (not shown) of the hub 107 through the center hole 107a of the hub 107.

The oil 103 that has reached the upper surface (not shown) of the hub 107 spreads thereon by centrifugal force, thereby to adhere to an unshown polygon-mirror, hard-disk, optical disk or the like mounted thereon.

As stated above, since the hub 107 tightly contacts the first rotation body 106 that is pressure-fitted to one end (the upper end) of the rotation shaft 105, the oil 103 that has once leaked from the oil-impregnated sintered bearing 104 can easily reach the hub 107 via the first rotation body 106, which deteriorates leakage prevention that has to be exerted by the first rotation body 106.

Therefore, there has been desired a motor in which even when lubricant that has leaked from a bearing reaches an oil deflector provided to oppose a hub, the oil is prevented from reaching the hub, which is assuredly able to prevent lubricant leakage.

SUMMARY OF THE INVENTION

The present invention has been made in view of the above. A first aspect of the present invention provides a motor comprising a stator portion including a bearing using lubricant oil; and a rotor portion having a rotation shaft rotatably supported by the bearing, an oil deflector configured to return back to the bearing the lubricant oil that has leaked toward one end portion of the rotation shaft from the bearing to one end portion of the rotation shaft, and a hub attached so as to oppose the oil deflector with a clearance therebetween.

A second aspect of the present invention provides a motor according to the first aspect, wherein three or more protrusions are formed on a surface of the oil deflector so as to oppose the hub, or a surface of the hub so as to oppose the oil deflector, the protrusions being configured to provide the clearance.

A third aspect of the present invention provides a motor according to the first or the second aspect, wherein the clearance is equal to or higher than a surface height of the lubricant oil that leaks from the bearing and adheres on the surface of the oil deflector.

According to the first aspect, the clearance provided between the oil deflector and the hub can prevent the lubricant oil from reaching the hub, even when the oil leaks from the bearing to adhere on the surface of the oil deflector, the surface opposing the hub, thereby improving a quality thereof.

In addition, according to the second aspect, since the plural of protrusions are formed on the opposing surface of the oil deflector to the hub, or the opposing surface of the hub to the oil deflector, the clearance therebetween is assuredly provided and thus the same effects as the first aspect is exhibited. In addition, the clearance can be made not by using a particular jig, a space or the like.

Moreover, according to the third aspect, since the clearance is designed with consideration given to the surface level of the oil that leaks from the bearing to adhere on the oil deflector surface opposing the hub, the oil cannot reach the hub, thereby further improving a quality thereof.

DESCRIPTION OF THE PREFERRED EMBODIMENTS

Referring to accompanying drawings, a motor according to preferred embodiments of the present invention will be described hereinafter.

A First Embodiment

Figure 1:
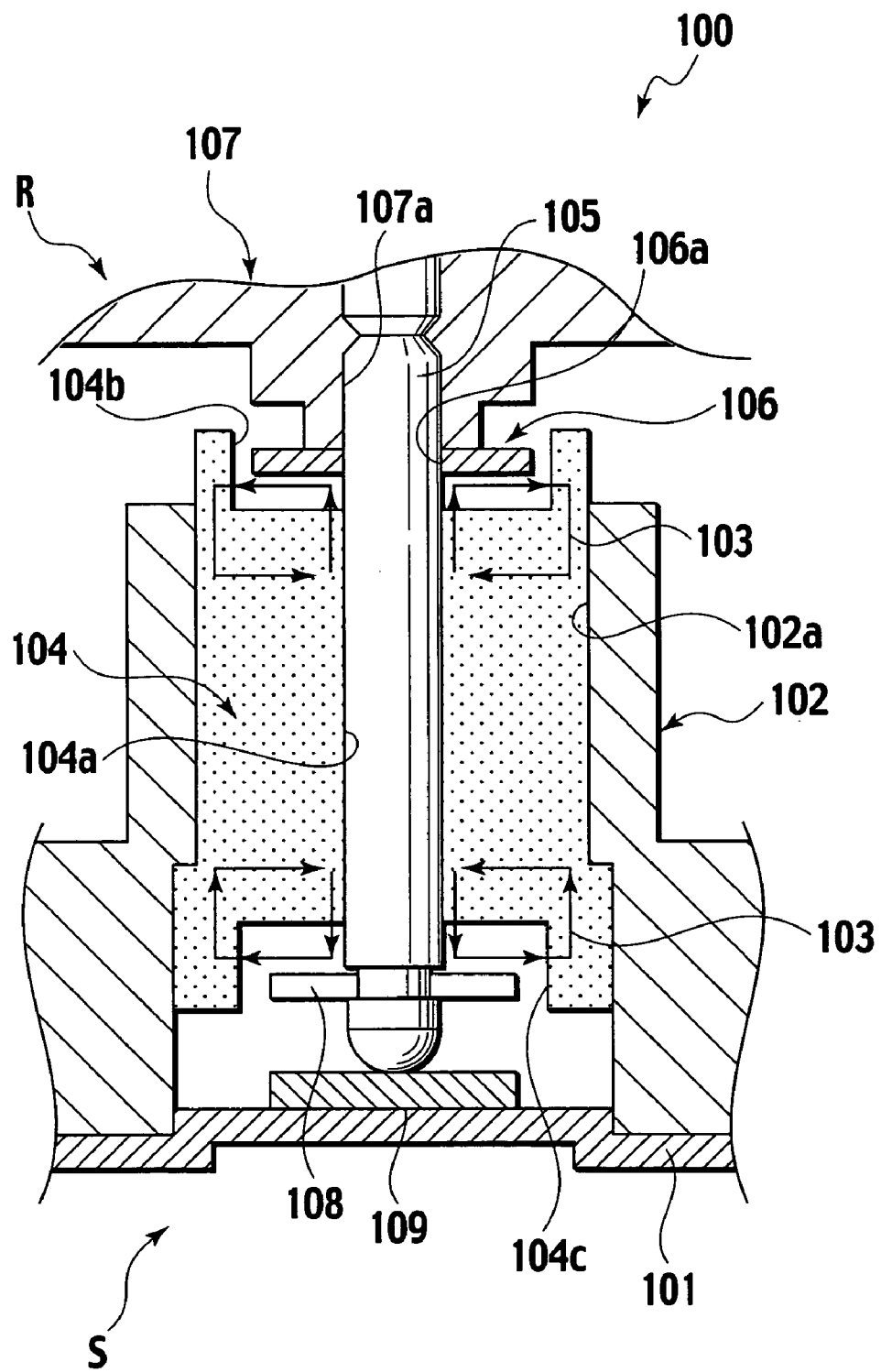
FIG. 1 is a magnified vertical cross-sectional view of the oil-impregnated sintered bearing of the related art motor, the oil-impregnated sintered bearing supporting rotatably a rotation shaft.
Figure 2:
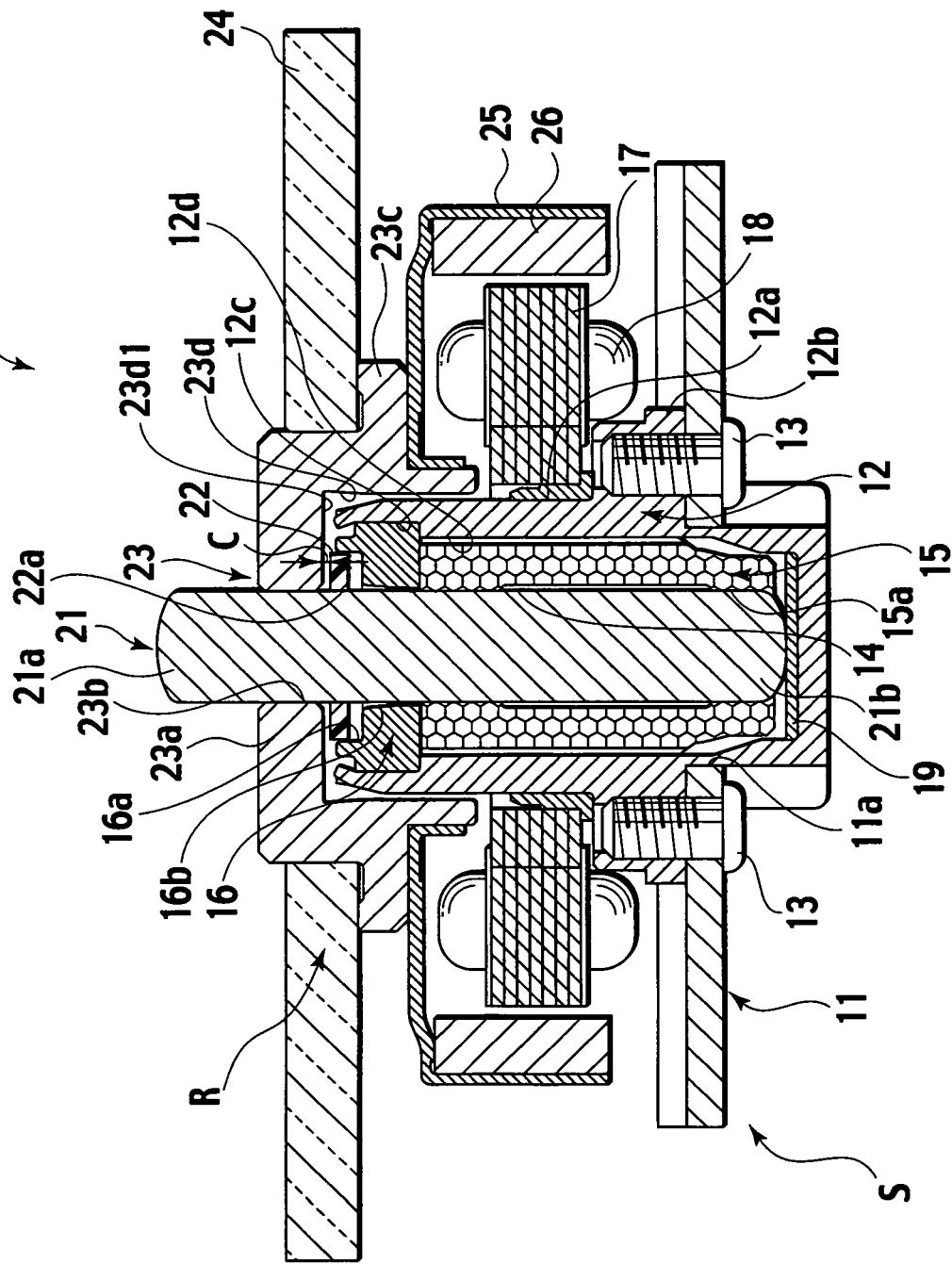
FIG. 2 is a vertical cross-sectional view illustrating a construction of a motor according to a first embodiment of the present invention.

As shown in FIG. 2, a motor 10A according to the first embodiment of the present invention is composed of a stator portion S stationarily mounted therein and a rotor portion R rotatably driven in relation to the stator portion S.

In the stator portion S, a motor base 11, which serves as a base of the stator portion S, is formed of a metal sheet material to be plate-shaped and provided with a positioning hole 11a perforated through the center portion thereof.

On the motor base 11, there is attached a bearing holder 12 formed of brass, aluminum or the like into a shape of flanged cylinder. Specifically, the lower portion of the bearing holder 12 is inserted into the positioning hole 11a made in the motor base 11. In addition, a flange portion 12b formed at the end of an outer circumference 12a of the bearing holder 12 is screwed on the motor base 11 using a plural of screws 13.

Moreover, the bearing holder 12 has a circular concave portion 12c open upward in the upper portion thereof and a bottomed center hole 12d provided below and concentrically with the circular concave portion 12c.

Into the bottomed center hole 12d of the bearing holder 12 is attached by pressure-fitting or a like method an oil-impregnated sintered bearing 15 impregnated with lubricant (oil) 14. The upper end of the bearing 15 is positioned at the same level with the bottom of the circular concave portion 12c of the bearing holder 12. The oil-impregnated sintered bearing 15 has a center hole 15a perforated through the center portion thereof. Into the center hole 15a, a rotation shaft 21 (described later) of a rotor portion R is to fit.

In addition, into the circular concave portion 12c of the bearing holder 12 is fitted a bearing cap 16 by pressure-fitting or a like method. The bearing cap 16 serves to prevent removal of the oil-impregnated sintered bearing 15 from the bearing holder 12 and leakage of the oil 14 from the oil-impregnated sintered bearing 15.

The bearing cap 16 has a circular concave portion 16a open upward in the upper portion thereof and a tapered center hole 16b provided below and in the center portion of the circular concave portion 16ac. The tapered center hole 16b and the circular concave portion 16ac are concentric with each other. The tapered center hole 16b has an inner diameter that gradually increases upwardly. Into the tapered center hole 16b is inserted the rotation shaft 21 (described later) of the rotor portion R.

On the outer circumference of the bearing holder 12, there is attached a stator core 17 formed of stacked plates of silicon steel. Around the stator core 17 is wound a plural of stator coils 18.

In the rotor portion R, there is formed of a stainless steel rod or the like a relatively long rotation shaft 21 supported rotatably by the center hole 15a of the oil-impregnated sintered bearing 15.

As for the above-mentioned rotation shaft 21, an oil deflector 22 is pressure-fitted from above to an upper end portion (one end portion) 21a of the rotation shaft 21 and thus stays between both ends of the rotation shaft 21; and a hub 23 is pressure-fitted from above to the one end portion 21a of the rotation shaft 21 and opposes the oil deflector 22, leaving clearance C (described later) therebetween.

Figure 3:
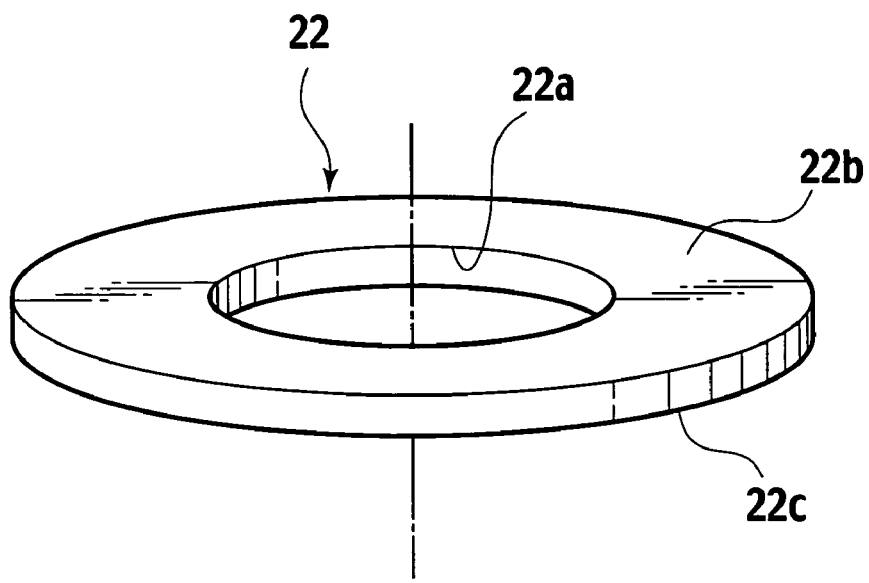
FIG. 3 is an expanded perspective view illustrating an oil deflector used in the motor according to the first embodiment of the present invention.

The oil deflector 22 serves to restrict a flow of oil 14 leaking from the oil-impregnated sintered bearing 15 and return the oil 14 back to the oil-impregnated sintered bearing 15, as shown in magnification in FIG. 3. The oil deflector 22 is made of POM (polyacetal) having rather high oil repellency and ring-shaped. The oil deflector 22 has in the center thereof a center hole 22a perforated through the center portion thereof, into which the rotation shaft 21 (FIG. 2) is pressure-inserted. The oil deflector 22 has an upper surface 22b opposing the hub 23 (FIG. 2) and a lower surface 22c being reverse to the upper surface 22b, the surfaces 22b, 22c being flat and parallel with each other. The oil deflector 22 is formed thick enough that the oil deflector 22 stays where it is designed to be after having been pressure-fitted therein, without being inclined with respect to the rotation shaft 21 (FIG. 2).

Referring back to FIG. 2, the hub 23 is formed of a brass or aluminum member. The hub 23 has a center hole 23b perforated through the center portion of a circular base portion 23a thereof. The center hole 23b is provided in order that the rotation shaft 21 is pressure-inserted thereinto. In the lower portion of the base portion 23a, there is formed a flange portion 23c having a larger diameter than that of the base portion 23a. On the flange portion 23c, there is mounted a polygon mirror 24. Although it is the polygon mirror 24 that is mounted on the flange portion 23c of the hub 23 in this embodiment, a hard disc or an optical disk (not shown) can instead be mounted thereon.

At the center portion in the lower surface of the base portion 23a of the hub 23, there is formed a circular concave portion 23d open downward. The circular concave portion 23d has as the ceiling thereof a circular flat surface 23d1 opposing the oil deflector 22. The upper portion of the bearing holder 12 enters the circular concave portion 23d without abutting thereon.

On the lower surface of the flange portion 23c of the hub 23, there is integrally attached a rotor yoke 25 having a cylinder shape. On the inner circumferential surface of the rotor yoke 25, there is fixedly attached by an adhesive or the like a ring-shaped magnet 26 having a plural of magnetized poles. The magnet 26 opposes the plural of coils 18 wounded around the stator core 17 in the stator portion S, leaving a slight gap therebetween.

The plural of the coils 18 wound around the stator core 17 of the stator portion S and the magnet 26 fixedly attached on the rotor yoke 25 of the rotor portion R constitute a magnetic drive means configured to rotate the rotor portion R in relation to the stator portion S.

The oil deflector 22 is pressure-fitted to the one end (upper end) portion 21a of the rotation shaft 21 and the hub 23 is pressure-fitted thereto to oppose the oil deflector 22, whereas the other end (lower end) portion 21b, which is opposite from the one end (upper end) portion 21a, is inserted into the tapered center hole 16b of the bearing cap 16 and then into the center hole 15a of the oil-impregnated sintered bearing 15. Furthermore, the other end (lower end) portion 21b, the extremity of which is formed to be hemispheric, abuts a thrust board 19 provided on the bottom of the bottomed center hole 12d of the bearing holder 12, which allows the rotation shaft 21 to be supported rotatably.

Figure 4:
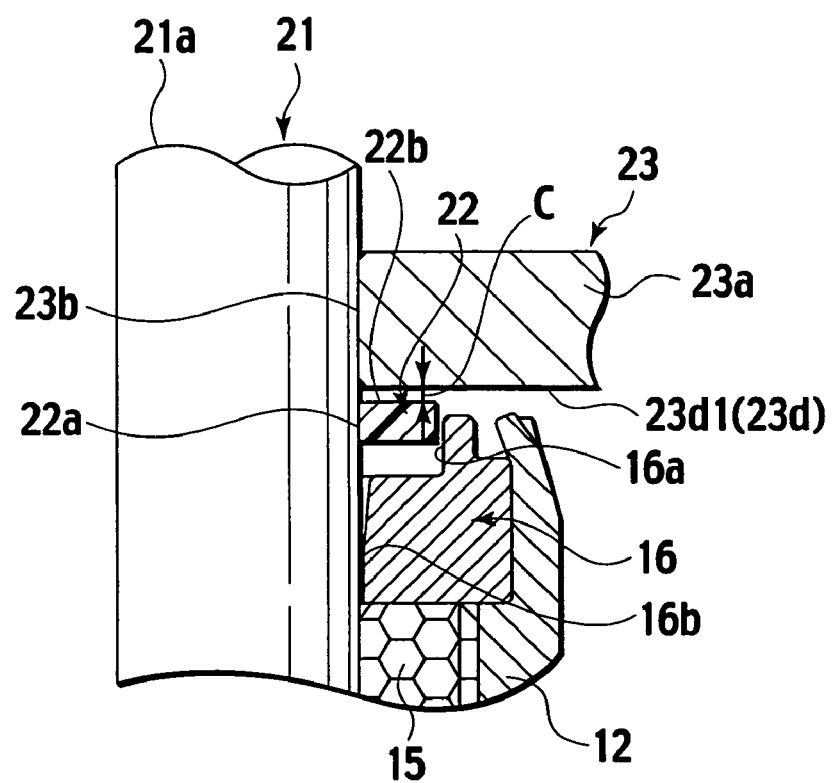
FIG. 4 is an expanded perspective view illustrating a vicinity of the oil deflector fixedly attached on one end of a rotation shaft and a hub.

As shown in magnification in FIG. 4, when the oil deflector 22 and the hub 23 opposing thereto are pressure-fitted to the one end portion 21a of the rotation shaft 21, the oil deflector 22 stays within the circular concave portion 16a of the bearing cap 16. Therefore, the oil 14 that has once leaked from the oil-impregnated sintered bearing 15 can return back toward the oil-impregnated sintered bearing 15 due to the oil deflector 22.

Since the tapered center hole 16b of the bearing cap 16 is tapered so that an inner diameter thereof gradually increases upwardly, as stated above, the clearance between the inner circumference of the center hole 16b and the outer circumference of the rotation shaft 21 having a constant outer diameter becomes larger upwardly, which can hinder an upward flow causing from a capillary phenomenon of the oil 14 from the oil-impregnated sintered bearing 15 to the oil deflector 22. Still, such a configuration is not sufficient for a complete prevention of the upward flow. That is, part of the oil 14 may pass through the tapered center hole 16b of the bearing cap 16 and then move toward the oil deflector 22 along the outer circumference of the rotation shaft 21.

In addition, as described in the related art section, since the center hole 22a of the oil deflector 22 and the center hole 23b of the hub 23 cannot be machined to a perfectly precise dimension and/or circularity, there can exist a gap between these holes and the rotation shaft 21. Therefore, part of the oil 14 that has passed through the tapered center hole 16b may flow along the outer circumference of the rotation shaft 21 and then pass through the center hole 22a of the oil deflector 22, thereby to reach the hub 23.

In order to prevent the oil from reaching the hub 23 in the first embodiment, there is provided a clearance C between the upper surface 22b of the oil deflector 22 and the circular flat surface 23d1 of the circular concave portion 23d formed in the center of the reverse surface of the hub 23 opposing the upper surface 22b. The clearance C can be made using a jig, a spacer (not shown) or the like when the oil deflector 22 and the hub 23 are pressure-fitted to the one end portion 21a of the rotation shaft 21. Due to the clearance C, even when the oil 14 that has leaked from the oil-impregnated sintered bearing 15 reaches the upper surface 22b of the oil deflector 22 via the rotation shaft 21, the oil 14 cannot reach the circular flat surface 23a, which is how an improvement is made.

In addition, the clearance C is set to be higher than an oil surface level (mm) of the oil 14 that has reached to stay on the upper surface 22b of the oil deflector 22 opposing the hub 23, the oil surface level being governed by surface tension thereof, surface conditions of the upper surface 22b, or the like.

Figure 5:
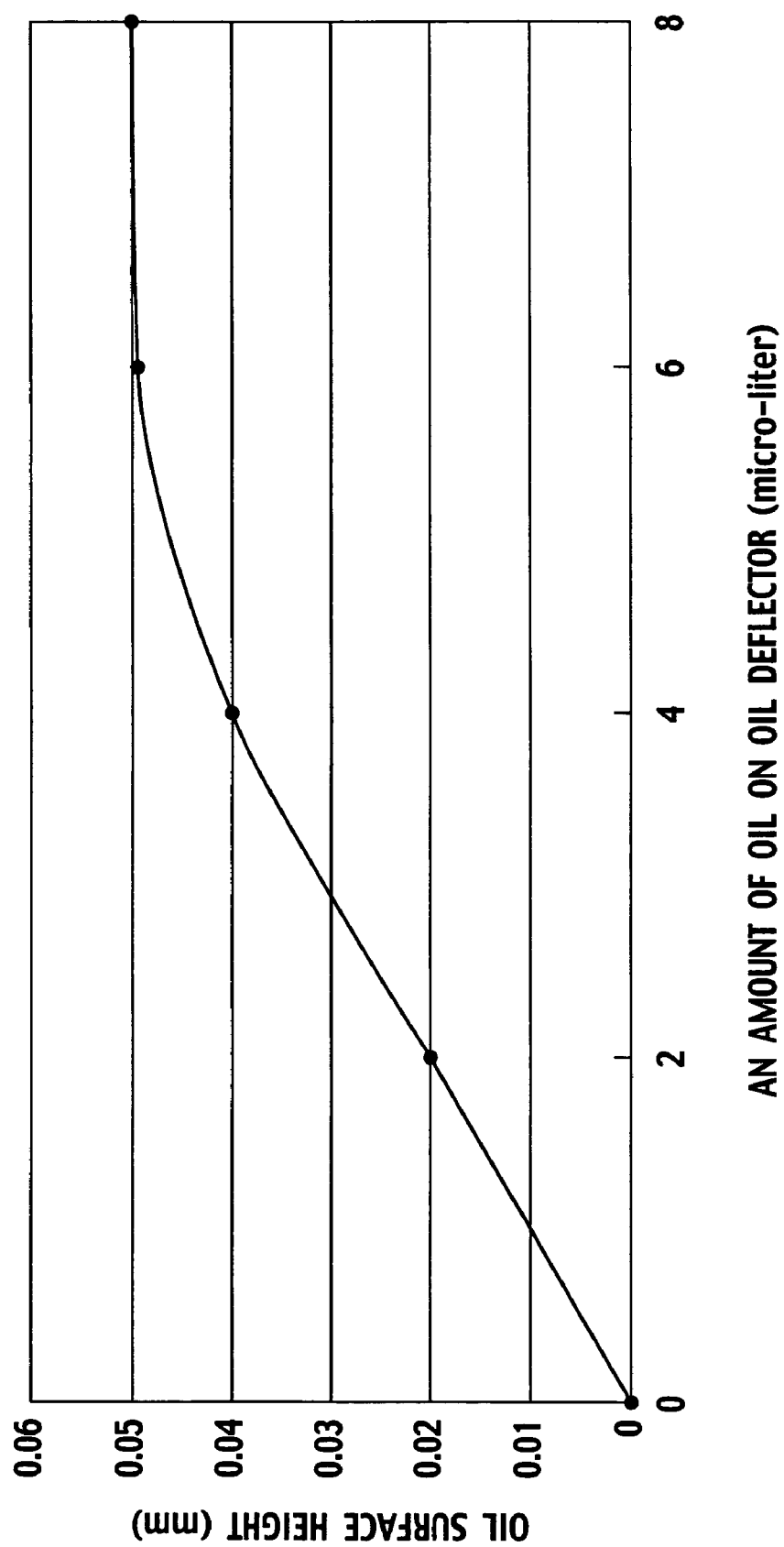
FIG. 5 is a diagram illustrating a relation between an amount of oil on the oil deflector and a height of the oil surface in the motor according to the first embodiment of the present invention.

Specifically, when an oil having a kinetic viscosity of about 10 cst is used as the oil 14 and a surface roughness of the upper surface 22b of the oil deflector 22 made of POM (polyacetal)

having a high oil repellency is set to be 1.6 S or less, for example, there has been obtained a relation between an amount of the oil on the oil deflector 22 and its oil surface level, as shown in FIG. 5.

In FIG. 5, the horizontal axis represents an amount of oil on the oil deflector by the micro-liter (μl) and the vertical axis represents an oil surface level of the oil (lubricant) by the millimeter (mm). As shown therein, when an amount of oil on the oil deflector increases from zero μl to 8 μl, the oil surface level rises accordingly and comes to be saturated at about 0.05 mm. Therefore, the clearance C of 0.05 mm or more assuredly prevents the oil 14 from reaching the hub 23, even when the oil 14 leaks from the oil-impregnated sintered bearing 15 to reach the upper surface 22b of the oil deflector 22 via the outer circumference of the rotation shaft 21. In addition, it is preferable to coat oil repellant agent on the entire surface of the oil deflector 22, even if the deflector 22 is made of POM (polyacetal) having a higher oil repellency, since the coating can further prevent the oil 14 from reaching the hub 23, even though such a coating ends up in an increased number of process steps.

Therefore, the oil 14 that comes to stay on the upper surface 22b of the oil deflector 22 cannot reach the upper surface of the flange portion 23c through the center hole 23b of the hub 23. Accordingly, the polygon mirror 24 or the like mounted on the flange portion 23c can be kept free from oil contamination when the rotor portion R rotates, thereby improving a quality of the motor 10A according to the first embodiment.

A Second Embodiment

Figure 6:
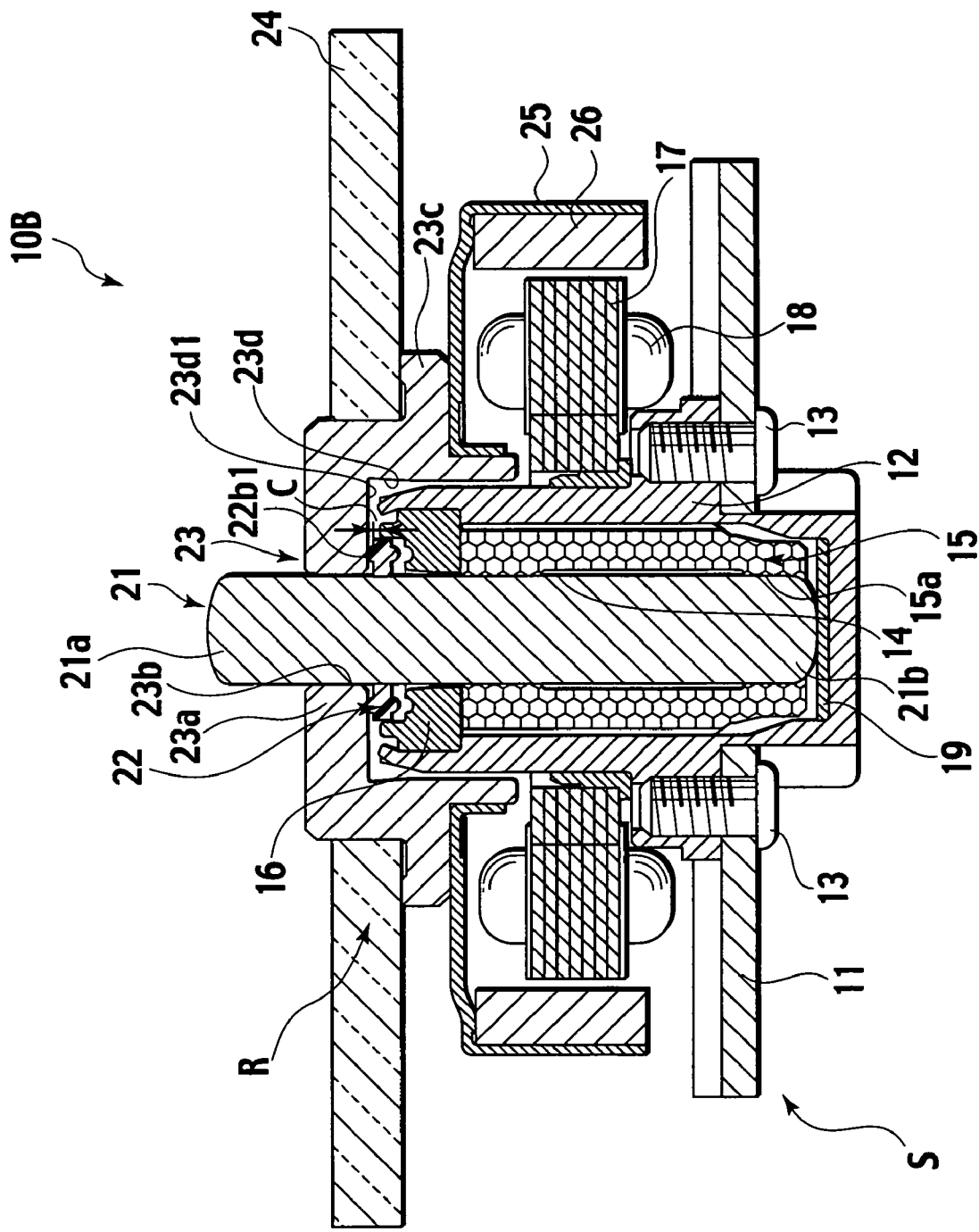
FIG. 6 is a vertical cross-sectional view of a motor according to a second embodiment of the present invention.

A motor 10B according to the second embodiment of the present invention shown in FIG. 6 is different from the above-described motor 10A according to the first embodiment in that an oil deflector has a partly different shape from the oil deflector 22 of the motor 10A. For the sake of convenience in describing the motor 10B, like components or members are represented by like numerals and undue repetition of explanation thereof will be omitted, whereas different components or members are represented by new reference marks and the following explanation will be focused on the differences.

Figure 7:
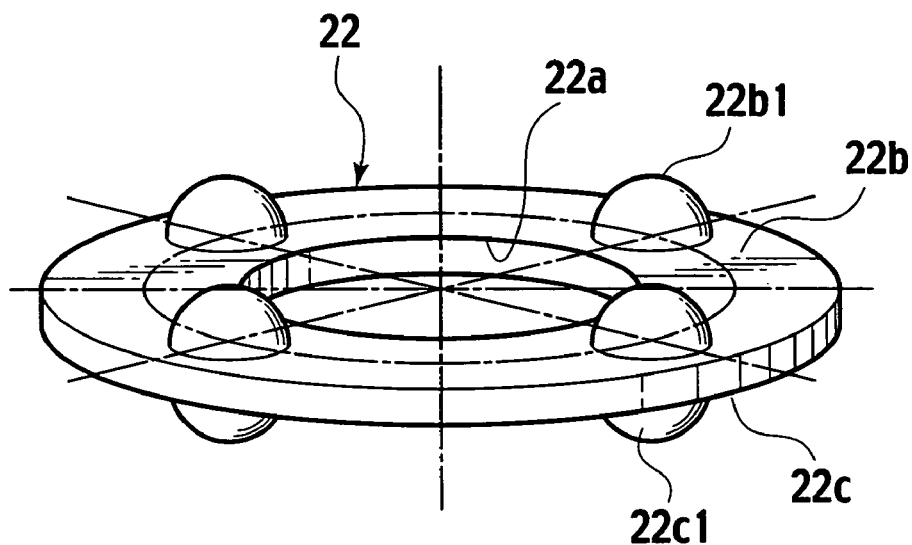
FIG. 7 is an expanded perspective view of each hemispherically convex portion formed on an upper and a lower surface of an oil deflector employed in the motor according to the second embodiment.

In the motor 10B according to the second embodiment of the present invention, the oil deflector 22 is formed to be ring-shaped using POM (polyacetal) having a high oil repellency, as shown in FIG. 7. In the oil deflector 22, there is formed the center hole 22a perforated in the center thereof in order to allow the rotation shaft 21 (FIG. 6) to be pressure-inserted.

On the flat upper surface 22b of the oil deflector 22 opposing the hub 23 (FIG. 6), a plural of hemispherically convex portions 22b1 prominent upwardly are formed around the center hole 22a In addition, on the flat lower surface 22c, a plural of hemispherically convex portions 22c1 prominent downwardly are formed around the center hole 22a.

The plural of hemispherically convex portions 22b1, 22c1 formed respectively on the upper and the lower surface 22b, 22c of the oil deflector 22 have a height that provides the clearance C (0.05 mm or more, for example) described in the first embodiment. In this particular embodiment, the hemispherically convex portions 22b1, 22c1 are formed to be a hemisphere having a radius of 0.1 mm. In addition, there are four hemispherically convex portions placed at angular intervals of 90 degrees along an identical circle (for example, a circle shown by a broken line in FIG. 6) on each of the surfaces 22b, 22c in the second embodiment, although three hemispherically convex portions make it possible for the oil deflector 22 to abut the hub 23 in parallel therewith without being slanted.

By the way, the oil deflector 22 can be pressure-fitted to one end portion 21a of the rotation shaft 21 (FIG. 6) from either side thereof so as to abut the bearing cap 16 (described later), since the plural of hemispherically convex portions 22b1, 22c1 are formed on the both surfaces 22b, 22c of the oil deflector 22, respectively.

Figure 8:
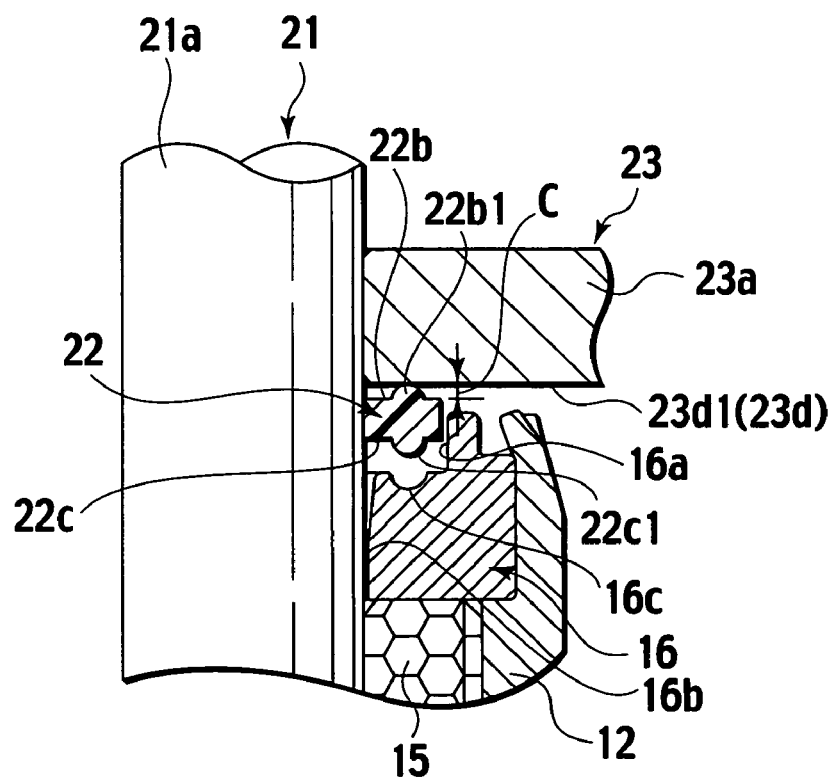
FIG. 8 is an expanded perspective view of a vicinity of a hub and an oil deflector fixedly attached on one end portion of a rotation shaft of the motor according to the second embodiment.

As shown in magnification in FIG. 8, when the oil deflector 22 and the hub 23 opposing thereto are pressure-fitted to the one end portion 21a of the rotation shaft 21, the plural of hemispherically convex portions 22b1 formed on the upper surface 22b of the oil deflector 22 abut the circular flat surface 23d1 in the circular concave portion 23d formed in the hub 23. At this time, there is made the clearance C between the upper surface 22b of the oil deflector 22 and the circular flat surface 23d1 of the hub 23, the clearance corresponding to the 0.1 mm radius of the hemispherically convex portions 22b1. Therefore, the clearance C is assured between the oil deflector 22 and the hub 23 without using a jig (spacer) or the like that has to be used for the motor 10A in the first embodiment.

With this configuration, even when the oil 14 leaks from the oil impregnated sintered bearing 15 and reaches to adhere on the upper surface 22b of the oil deflector 22 along the rotation shaft 21, the oil 14 cannot reach the lower surface of the hub 23 due to the clearance C.

By the way, similarly as described in the first embodiment, the clearance C described above is set to be equal to or higher than the oil surface level (mm) determined by the surface tension of the oil 14 adhered on the upper surface 22b of the oil deflector 22.

In addition, since the plural of hemispherically convex portions 22b1, 22c1 on the upper and the lower surface 22b, 22c of the oil deflector 22 have a shape of hemisphere, the contact area thereof to the hub 23 is reduced as great an extent as possible, which can prevent a flow of the oil from the upper surface 22b of the oil deflector 22 to the hub 23.

By the way, although it is the plural of hemispherically convex portions 22b1, 22c1 that are formed respectively on the upper and the lower surface 22b, 22c of the oil deflector 22 in this second embodiment, a plural of protrusions having various shapes can be formed thereon instead of the hemispherically convex portions 22b1, 22c1, as far as such protrusions (22b1, 22c1) protrude from the upper and the lower surface 22b, 22c of the oil deflector 22 and the contact area thereof to the hub 23 is as narrow as possible.

Additionally, there is formed in the second embodiment a receiving groove 16c in the circular concave portion 16a of the bearing cap 16. The receiving grooves 16c are made so as to correspond respectively to the plural of the hemispherically convex portions 22c1 formed on the lower surface 22c of the oil deflector 22. Therefore, the plural of the hemispherically convex portions 22c1 do not abut the bottom surface of the circular concave portion 16a but are fitted in the receiving grooves 16c. Namely, the oil deflector 22 contacts closely the bearing cap 16 without leaving a gap therebetween, which contributes to a reduction of the total height of the motor 10B.

According to the second embodiment, the oil 14 adhering on the upper surface 22b of the oil deflector 22 cannot reach the upper surface of the flange portion 23c through the center hole 23b of the hub 23. Therefore, the polygon mirror 24 or the like mounted on the flange portion 23c can be kept free from oil contamination when the rotor portion R rotates, thereby improving a quality of the motor 10B.

A Third Embodiment

Figure 9:
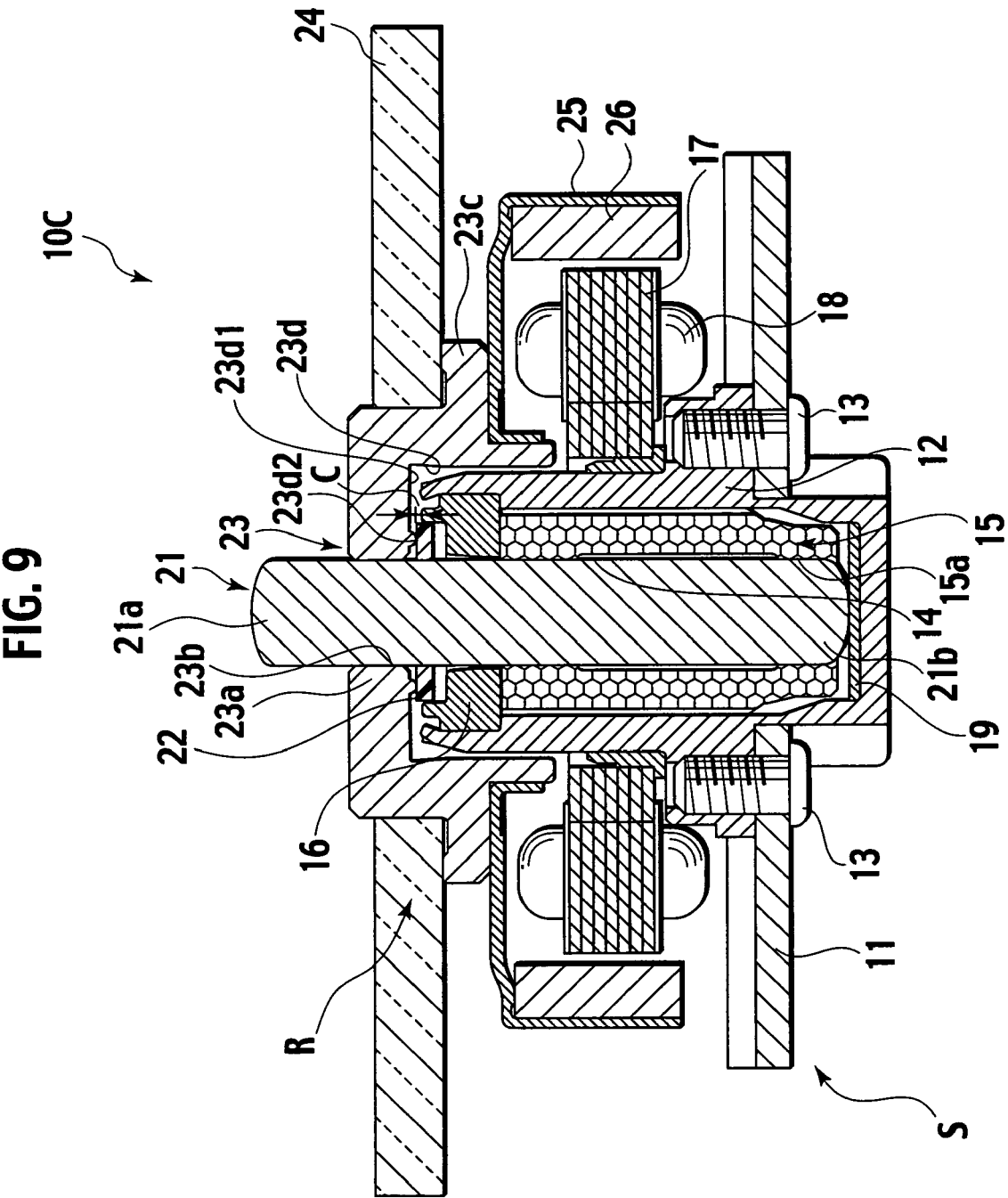
FIG. 9 is a vertical cross-sectional view of a motor according to a third embodiment of the present invention.

A motor 10C shown in FIG. 9 according to a third embodiment is different from the motor 10A according to the first embodiment, only in that a hub has a shape different from the hub 23 of the motor 10A. For the sake of convenience in describing the motor 10C, like components or members are represented by like numerals and undue repetition of explanation thereof will be omitted, whereas different components or members are represented by new reference marks and the following explanation will be focused on the differences.

Figure 10:
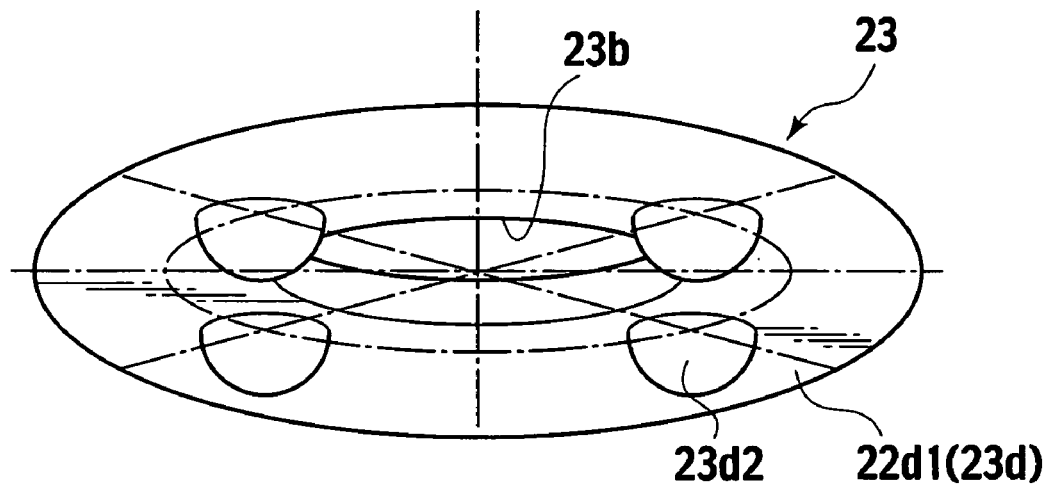
FIG. 10 is an expanded perspective view of a plural of hemispherically convex portions formed on a circular flat surface in a bottom surface of a circular concave portion of a hub to be employed in the third embodiment.

In the motor 10C according to the third embodiment of the present invention, there is formed a plural of hemispherically convex portions 23d2 on the circular flat surface 23d1, which is the ceiling of the circular concave portion 23d open downward in the hub 23, as shown in magnification in FIG. 10. The plural of hemispherically convex portions 23d2 are provided around the center hole 23b and protrude downward. A height of the hemispherically convex portions 23d2 is set to be equal to or higher than the clearance C (for example, 0.05 mm or more). Specifically, the hemispherically convex portions 23d2 are formed into a hemisphere having a radius of 0.1 mm in this embodiment, which provides the clearance C of 0.1 mm. In addition, in this particular embodiment, there are formed four hemispherically convex portions 23d1 arranged at angular intervals of 90 degrees along an identical circle on the circular flat surface 23d1, although three hemispherically convex portions are sufficient as stated in the second embodiment.

Figure 11:
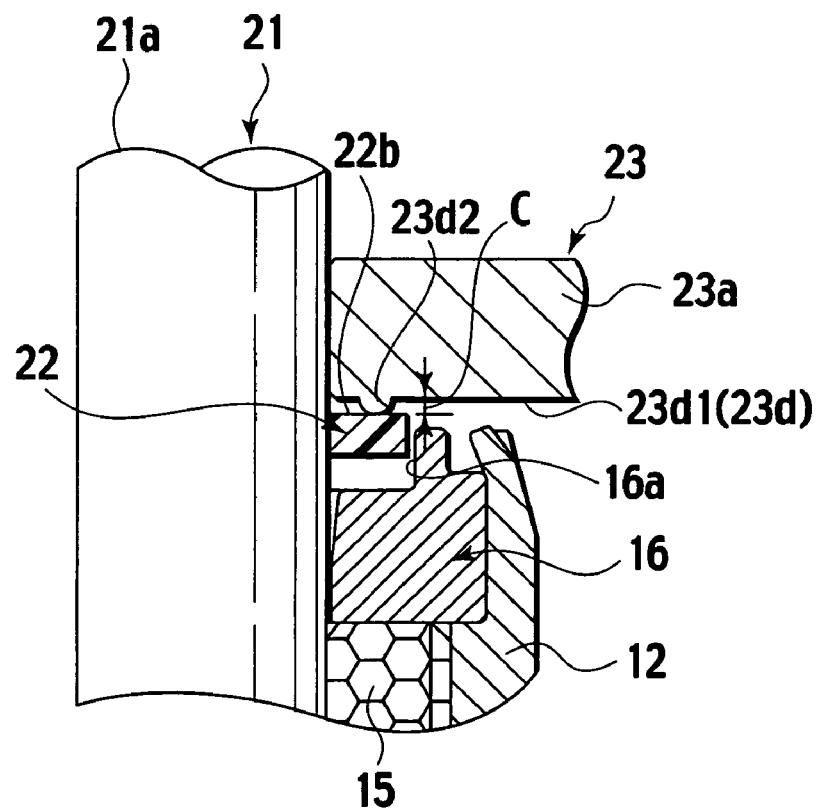
FIG. 11 is an expanded perspective view of a vicinity of an oil deflector and a hub fixedly attached on one end portion of a rotation shaft in the motor according to the third embodiment of the present invention.

As shown in magnification in FIG. 11, when the oil deflector 22 is pressure-fitted to the one end portion 21a of the rotation shaft 21 and then the hub 23 is pressure-fitted to the one end portion 21a so as to oppose the oil deflector 22, the plural of hemispherically convex portions 23d2 formed on the circular flat surface 23d1 of the circular concave portion 23d of the hub 23 abut the upper surface 22b of the oil deflector 22. Therefore, there is made the clearance C corresponding to the radius of 0.1 mm of the hemispherically convex portions 23d2 between the upper surface 22b of the oil deflector 22 and the circular flat surface 23d1. The clearance C is assuredly provided not by using a jig (spacer) or the like which has to be used in the first embodiment.

Accordingly, even when the oil 14 leaks from an oil-impregnated sintered bearing 15 and reaches to stay on the upper surface 22b of the oil deflector 22 along the outer circumference of the rotation shaft 21, the oil 14 cannot farther reach the lower surface of the hub 23 due to the clearance C.

By the way, the clearance C is set to be equal to or higher than the oil surface level (mm) determined by the surface tension of the oil 14 adhering on the upper surface 22b of the oil deflector 22, in the same manner as described in the first embodiment.

According to this embodiment, the oil 14 adhering on the upper surface 22b of the oil deflector 22 cannot reach the upper surface of the flange portion 23c through the center hole 23b of the hub 23, and thus the polygon mirror 24 or the like mounted on the flange portion 23c can be kept free from oil contamination when the rotor R rotates, thereby improving a quality of the motor 10C.

By the way, although it is the plural of hemispherically convex portions 23d2 that are formed on the circular flat surface 23d1 of the hub 23 in the third embodiment, a plural of protrusions having various shapes can be formed thereon, instead of the hemispherically convex portions 23d2, as far as such protrusions (23d2) formed on the circular flat surface 23d1 of the hub 23 have a narrow contact area to the upper surface 22b of the oil deflector 22.

By the way, the first, the second, and the third embodiment have detailed the motors 10A, 10B, and 10C, respectively, which are equipped, as a bearing, with the oil-impregnated bearing 15 impregnating oil. However, since other types of bearings, for example, a fluid pressure bearing, a ball bearing or the like (not shown) are subjected to use of lubricant oil or grease, the technological idea disclosed here is applicable to such bearings and a motor including such bearings can fall within the scope of the present invention.

Additionally, although the oil deflector 22 made of POM (polyacetal) having a high oil repellency is exemplified in the motors 10A, 10B, and 10C of the first, the second, and the third embodiment, a material for the oil deflector 22 is not limited to POM but may be other materials having a high oil repellency. When other materials are used, it is needless to state that the clearance C between the oil deflector 22 and the hub 23 should be designed anew in accordance with an oil surface level governed by surface tension of the oil, taking into consideration various factors such as the material of the oil deflector 22 and an oil repellant agent applied on the surface thereof.

Although the invention has been described in conjunction with the foregoing specific embodiments, many alterations and modifications will be apparent to those skilled in the art. Those alterations and modifications are intended to fall within the spirit and scope of the appended claims.

What is claimed is:

1. A motor comprising:
    a stator;
    a rotor including a hub and rotatably supported through a bearing portion with respect to the stator,
        the bearing portion including:
            a rotation shaft; and
            a bearing using lubricant and including a hole into which the rotation shaft is inserted,
    an oil deflector provided on the rotation shaft and configured to return back to the bearing the lubricant that leaks toward a hub side of the rotation shaft from the bearing; and
    a clearance portion formed between a flat surface of the hub and a flat surface of the oil deflector which are opposed to each other and configured to prevent the oil deflector from tightly contacting the hub, wherein three or more protrusions are formed on the flat surface of the oil deflector so as to oppose the hub, or the flat surface of the hub so as to oppose the oil deflector, the protrusions being configured to provide the clearance portion.

2. A motor as recited in claim 1, wherein the clearance portion is equal to or higher than a surface height of the lubricant that leaks from the bearing and adheres on the flat surface of the oil deflector.

* * * * *